US 9,463,378 B2

(12) United States Patent
Namgoong (10) Patent No.: US 9,463,378 B2
(45) Date of Patent: Oct. 11, 2016

(54) METHOD, TERMINAL, SERVER, AND RECORDING MEDIUM FOR PROVIDING TACTIC HOT KEY SERVICE

(71) Applicant: Intellectual Discovery Co., Ltd., Seoul (KR)

(72) Inventor: Yoon Namgoong, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 122 days.

(21) Appl. No.: 14/363,957

(22) PCT Filed: Nov. 22, 2012

(86) PCT No.: PCT/KR2012/009934
§ 371 (c)(1),
(2) Date: Jun. 9, 2014

(87) PCT Pub. No.: WO2013/085185
PCT Pub. Date: Jun. 13, 2013

(65) Prior Publication Data
US 2014/0302901 A1    Oct. 9, 2014

(30) Foreign Application Priority Data

Dec. 9, 2011  (KR) .................. 10-2011-0132344

(51) Int. Cl.
*A63F 13/00* (2014.01)
*A63F 13/533* (2014.01)
(Continued)

(52) U.S. Cl.
CPC .............. *A63F 13/005* (2013.01); *A63F 13/22* (2014.09); *A63F 13/533* (2014.09); *A63F 13/812* (2014.09)

(58) Field of Classification Search
USPC .............................................. 463/4
See application file for complete search history.

(56) References Cited

U.S. PATENT DOCUMENTS 9,138,652 B1 *  9/2015 Thompson ......... H04N 21/2358
2003/0161476 A1 *  8/2003 Fransdonk .............. G06Q 20/12
380/282

(Continued)

FOREIGN PATENT DOCUMENTS

JP     2005-245784 A    9/2005
KR  10-2001-0001072 A    1/2001

(Continued)

OTHER PUBLICATIONS

English translation of International Preliminary Report on Patentability, International Search Report and Written Opinion issued in International Appln. No. PCT/KR2012/009934, mailed Jun. 10, 2014, 10 pages.

(Continued)

*Primary Examiner* — Pierre E Elisca (57) ABSTRACT

A server for providing a tactic hot key service includes: a communicator connected to a plurality of terminals in a wired or wireless manner, receiving manipulation of each terminal, and transmitting data that are appropriate for the terminal; a controller for controlling respective constituent elements, simultaneously being an input/output path of the data, and outputting data to the communicator so that data may be displayed to the terminals based on the data that are input through the communicator; and a storage unit for storing a unique identity code for identifying the terminal, a hot key for tactics used for a soccer game, and tactics data matching the hot key.

15 Claims, 9 Drawing Sheets

(51) Int. Cl.
*A63F 13/22* (2014.01)
*A63F 13/812* (2014.01)

(56) References Cited

U.S. PATENT DOCUMENTS

| | | | | |
|---|---|---|---|---|
| 2003/0167392 | A1* | 9/2003 | Fransdonk | G06F 21/10 713/156 |
| 2006/0193474 | A1* | 8/2006 | Fransdonk | H04L 9/0825 380/279 |
| 2007/0180496 | A1* | 8/2007 | Fransdonk | G06Q 20/027 726/3 |
| 2008/0220872 | A1* | 9/2008 | Midgley | A63F 13/12 463/42 |
| 2014/0100026 | A1* | 4/2014 | Seo | A63F 13/10 463/29 |
| 2014/0349750 | A1* | 11/2014 | Thompson | A63F 13/12 463/31 |
| 2015/0375117 | A1* | 12/2015 | Thompson | A63F 13/35 463/9 |

FOREIGN PATENT DOCUMENTS

| | | |
|---|---|---|
| KR | 10-0708494 B1 | 4/2007 |
| KR | 10-2007-0108283 A | 11/2007 |

OTHER PUBLICATIONS

"Guide on Regular Checkup and Update(patch) on Aug. 1," Naver Cafe, [Online] Aug. 1, 2011, p. 3, 4 Retrieved from the Internet: URL:http://cafe.naver.com/fcmsebitya/16. English translation also provided (13 pages).

* cited by examiner

METHOD, TERMINAL, SERVER, AND RECORDING MEDIUM FOR PROVIDING TACTIC HOT KEY SERVICE

CROSS REFERENCE TO RELATED APPLICATIONS

This application is a 35 U.S.C. §371 National Phase Entry Application from PCT/KR2012/009934, filed Nov. 22, 2012, and designating the United States, which claims priority under 35 U.S.C. §119 to Korean Patent Application No. 10-2011-0132344 filed Dec. 9, 2011, which are incorporated herein in their entireties.

TECHNICAL FIELD

The present invention relates to a method, terminal, server, and recording medium for providing a tactic hot key service. More particularly, the present invention relates to a method, terminal, server, and recording medium for providing a tactic hot key service for displaying a tactic hot key to a user.

BACKGROUND ART

In general, soccer is one of ball games played by two teams, it is a representative team sport in which players use feet to control a ball and score goals, eleven players make one team, two teams play it, and the two teams configured with players kick the ball using their feet and heads and shoot it into the other team's net to score goals.

After the soccer rules were established, in order to organize one team with eleven players, a formation signifying a rank or disposal of the players playing in the field in the soccer match was introduced, a plurality of formations are used depending on playing dispositions and aims of the team, they are named by a number of players who are disposed to their positions, and they start from the number of defenders excluding a goalkeeper.

Soccer's tactics and formation have a large association, but it is impossible to determine the playing dispositions of the team only with the formation, and for example, the same 4-4-2 formation may be attack-oriented or defense-oriented according to the team.

The formation may be changed many times during the game, the changes require the players' tactical understanding and ability to take action, and the formation may be changed by the team's tactical aim or may be unavoidably changed by the players' walking out because of fouls.

Figure 1:
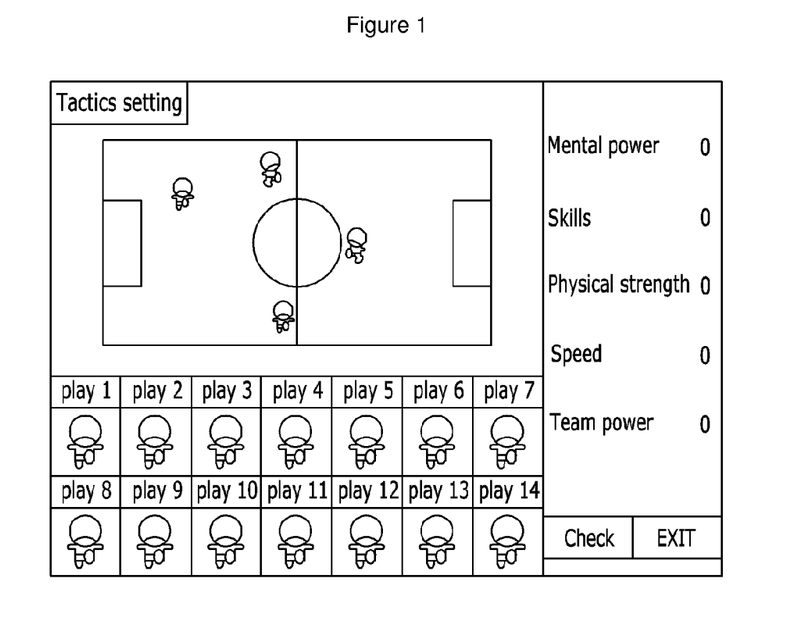
FIG. 1 shows an example of a strategy training screen according to conventional art.

The soccer game using the above-noted tactics is disclosed in Korea Patent Laid-Open Publication No. 10-2001-0001072, and FIG. 1 shows an exemplary diagram of a tactics training screen according to conventional art. As shown in FIG. 1, regarding a process for building strategies and tactics, when an opposing team is selected in the case of a friendly match, a tactics screen shown in FIG. 1 is displayed.

A user may dispose a desired player at a desired position while chatting with the opposite party on the tactics screen, and he performs re-disposal according to the tactics and strategy when respective positions of the players are reset and he exercises tactics on the game screen.

When the user chooses one player and advances him to the opponent's side, other players move according to a manner they learned through the team training process, and when he makes use of other tactics such as a free kick, a frontal breakthrough, a wing attack, an offside trap, a man-to-man defense, or a personal defense, the same is possible when he selects desired tactics from among tactics icons, and the selected tactics are processed in advance according to the tactics trained before the game and applied by a game program.

Most operations used for game performance are operable by a mouse, a hot key is assigned in addition to the mouse, and the hot key is assigned to a personal training screen, a tactic training screen, and a match screen.

On the personal training screen, hot keys of waterfall (b), tire (t), climbing (a), training (r), labor hum (w), shooting (s), ball keeping (d), pass (p), health (h), dining out (e), and rest (f) are used, and on the tactics training screen, hot keys of free key (f), offside (o), man-to-man defense (a), personal defense (i), frontal breakthrough (c), and wing attack (w) are used.

However, in the soccer game in which various users do not control the eleven players but the user moves the one player who is adjacent to the player who is keeping the ball, no modification is allowable after the formation is set and the game starts, so it was difficult to apply tactics not because the respective users play the game but because artificial intelligence (AI) is driven according to predetermined formations, and when tactics are applied as well as the formation while playing the same, it is difficult for the user to control the player under his control, so even when a hot key for the tactics is provided, that is, when there are contents in the game by which the tactics are not applicable like a director, they cannot be used aggressively.

DISCLOSURE

Technical Problem

The present invention has been made in an effort to provide a method for providing a tactic hot key service for allowing to change a formation while a game is played by providing a hot key familiar to a user in addition to hot keys used in the game, and maximizing usage by showing it on a screen so that the user may change the formation according to a match flow when the formation of soccer is determined before the game begins, as well as a terminal, a server, and a recording medium.

The present invention has been made in another effort to provide a method for providing a tactic hot key service for allowing to control a player as well as a player controllable by a user with an easy hot key and increasing interest of a game with abundant items, and displaying it on a screen to increase usability by providing hot keys for a tactic item controllable by remaining players and tactics as hot keys on a position for the user to input since the user controls one player and remaining players respectively play a game according to a formation established by AI, as well as a terminal, a server, and a recording medium.

The present invention has been made in another effort to provide a method for providing a tactic hot key service for considering differences of skills of users, distinguishing users who are not familiar and basic keys from users who are familiar with the basic keys, detecting accuracy of users' key usage to make a database, classifying the users according to accuracy to illustrate tactics for respective stages, and displaying the provided tactics for respective stages until the user uses the same method, as well as a terminal, a server, and a recording medium.

The present invention has been made in another effort to provide a method for providing a tactic hot key service for allowing a user to actively use contents while he cannot but concentrate on a screen by showing hot keys such as formations or tactics on the screen so that he may actively use the contents such as formations or tactics in a busy game in which controlled players are continuously changed, as well as a terminal, a server, and a recording medium.

The present invention has been made in another effort to provide a method for providing a tactic hot key service for automatically recommending tactics suitable for a current game situation, applying recommended tactics when a game is performed in a recommendation mode and a user presses a same key, thereby automatically changing and applying the tactics when the user changes the tactics and he can recognize one key, and showing such a hot key on a screen to increase a recognition rate, as well as a terminal, a server, and a recording medium.

Technical Solution

An exemplary embodiment of the present invention provides a server for providing a tactic hot key service, including: a communicator connected to a plurality of terminals in a wired or wireless manner, receiving manipulation of each terminal, and transmitting data that are appropriate for the terminal; a storage unit for storing a unique identity code for identifying the terminal, a hot key for tactics used for a soccer game, and tactic data matching the hot key; a controller for controlling respective constituent elements, simultaneously being an input/output path of the data, and outputting data to the communicator so that the tactic data and the hot key may be displayed on screens of the terminals based on the data that are input through the communicator.

Another embodiment of the present invention provides a server for providing a tactic hot key service, including: a communicator connected to a plurality of terminals in a wired or wireless manner and receiving manipulations from terminals and transmitting appropriate data to the terminals; a storage unit for storing a proper identification code for identifying the terminal, a hot key for tactics used in a soccer game, tactic data matching the hot key, accuracy of a key input that is input by the terminal, and a game situation; a tactic filtering unit for outputting data so that a number of tactics that is proportional to the accuracy of the key input and a hot key for the tactics may be displayed to the terminal; and a controller for controlling respective constituent elements, simultaneously being an input/output path of the data, and outputting data to the communicator so that the tactic that are output by the tactic filtering unit and the hot key may be displayed on screens of the terminals based on the data of the terminal that are input through the communicator.

Another embodiment of the present invention provides a server for providing a tactic hot key service, including: a communicator connected to a plurality of terminals in a wired or wireless manner and receiving manipulations from terminals and transmitting appropriate data to the terminals; a storage unit for storing a proper identification code for identifying the terminal, a hot key for tactics used for a soccer game, tactic data matching the hot key, a game situation, and a user's input for determining whether to select a mode for automatically recommending the tactics; a tactic filtering unit for, when the automatically recommending mode is selected, receiving information on the game situation, and outputting tactics applicable to the current game situation to a game terminal; and a controller for controlling respective constituent elements, simultaneously being an input/output path of the data, and outputting data to the communicator so that the tactic that are output by the tactic filtering unit and the hot key may be displayed on screens of the terminals based on the data that are input through the communicator.

Another embodiment of the present invention provides a terminal for providing a tactic hot key service, including: a communicator connected to a server in a wired or wireless manner and receiving an output of the server and outputting a user's input for manipulating a terminal to the server; a controller for controlling respective constituent elements, simultaneously being an input/output path of the data, and controlling the respective constituent elements based on the data that are input through the communicator; an input unit for outputting the user's input to the controller; a storage unit for storing a UI on a tactic hot key used for a soccer game; and a display unit for displaying the UI of the storage unit to a screen according to an attack mode or a defense mode of the soccer game.

Another embodiment of the present invention provides a terminal for providing a tactic hot key service, including: a communicator connected to a server in a wired or wireless manner and receiving an output of the server and outputting a user's input for manipulating a terminal to the server; a controller for controlling respective constituent elements, simultaneously being an input/output path of the data, and controlling the respective constituent elements based on the data that are input through the communicator; an input unit for outputting the user's input to the controller; a tactic hot key service storage unit for storing a game situation input by the controller, a hot key for tactics, the tactics matching the hot key, and an input for determining whether to select a mode for automatically recommending the tactics, and when the automatically recommending mode is selected, receiving information on the game situation, and outputting a tactics to be applied in the current game situation and a hot key for the tactics to the controller so that they may be displayed on the screen; and a display unit for displaying the tactics and a hot key for the tactics on the screen.

Another embodiment of the present invention provides a method for providing a tactics hot key service, including: a first stage for, when a game begins and a soccer game is in an attack mode, outputting tactics caused by an attack to a display unit of the terminal by a server and/or a controller of a terminal, matching the tactics and a hot key of a keyboard of the terminal, and displaying the same to a screen; a second stage for, when the soccer game is in a defense mode, outputting tactics caused by defense to the display unit of the terminal by the server and/or the controller of the terminal, matching the tactics and the hot key of the keyboard of the terminal, and displaying the same to the screen; and a third stage for returning to the first stage and repeating a loop until the game is over.

Another embodiment of the present invention provides a method for providing a tactics hot key service including: a first stage for storing key accuracy of a user manipulating a terminal in the server and/or the terminal when a game begins; a second stage for the server and/or the terminal to monitor a game situation of the game and store the same; and a third stage for controlling the server and/or the terminal to output a number of tactics that are proportional to the key accuracy to a display unit of the terminal, matching the tactics and a hot key of a keyboard of the terminal, and displaying the same to a screen.

Another embodiment of the present invention provides a method for providing a tactics hot key service including: a first stage for, when a game begins and a user manipulating a terminal selects tactics according to an automatic recommendation mode, and storing the selection in a server and/or the terminal; a second stage for monitoring and storing a game situation of the game by the server and/or the terminal; and a third stage for allowing the server and/or the terminal to control a hot key of the tactics that is appropriate for the game situation to be displayed to the terminal, matching the tactics and a hot key of a keyboard of the terminal, and displaying the same to a screen.

Another embodiment of the present invention provides a computer readable medium for recording a program in the recordable medium for recording a program for executing a method for providing a tactic hot key service, the program realizing a function for, when a game begins and a soccer game is in an attack mode, outputting tactics caused by an attack to a display unit of the terminal by a server and/or a controller of a terminal, matching the tactics and a hot key of a keyboard of the terminal, and displaying the same to a screen; a function for, when the soccer game is in a defense mode, outputting a tactics caused by a defense to the display unit of the terminal by the server and/or the controller of the terminal, matching the tactics and the hot key of the keyboard of the terminal, and displaying the same to the screen; and a function for returning to the first stage and repeating a loop until the game is over.

Another embodiment of the present invention provides a computer readable medium for recording a program in a recordable medium for recording a program for executing a method for providing a tactic hot key service, the program realizing: a function for storing key accuracy of a user manipulating a terminal in the server and/or the terminal when a game begins; a function for the server and/or the terminal to monitor a game situation of the game and store the same; a function for, when a user selects tactics according to an automatic recommendation mode, storing the selection in a server and/or the terminal; a function for controlling the server and/or the terminal to display a number of tactics proportional to the key accuracy to the terminal, matching the tactics and a hot key of a keyboard of the terminal, and displaying the same on a screen; and a function for allowing the server and/or the terminal to control a hot key of the tactics that is appropriate for the game situation to be displayed to the terminal, matching the tactics and a hot key of a keyboard of the terminal, and displaying the same to a screen.

Advantageous Effects

As described above, the disclosed skill of the present invention having the above-described configuration may have the effects of ① allowing to change a formation that is mistakenly set by the user by recognizing a hot key shown on the screen while playing a game, and preventing him from selecting giving up the game or leaving it while the game is performed, by providing a hot key that is familiar to him in addition to hot keys that are used in the game so that he may change the formation according to game flows and may actively use an formation change item, ② using abundant items at 100% to increase interest in the game by setting the hot key with a key familiar to the user and displaying it on the screen so that he may actively use a tactics item for controlling other players as well as players controlled by him, ☐ considering the differences of skills of respective users, distinguishing the user for respective stages according to key usage accuracy of the user, displaying tactics keys in a stepwise manner according to distinguished levels until he accurately use the tactics key to provide a game and teach him until he fully uses it so that new users may easily apply tactics, ④ easily recognizing and changing the tactics when he is busy focusing on the screen by showing the hot key on the screen so that he may actively use contents such as formations or tactics, and ⑤ automatically recommending tactics satisfying the current game situation, and when the game is played by the recommendation mode, allowing the recommended tactics to be automatically applied when the user presses the same key, and thereby allowing to change the tactics quite freely when he tries to change the tactics but lacks skills, continuously displaying the same key on the screen so that he may recognize it, and allowing him to actively use the tactics item.

MODE FOR INVENTION

Descriptions on the disclosed skill are exemplary embodiments for a structural or functional description, and the scope of the disclosed skill is not to be understood to be restricted by the exemplary embodiment described in the specification. That is, it is to be understood that the exemplary embodiment is intended to cover various modifications and equivalent arrangements included within the spirit and scope of the appended claims. Further, the proposed objects or effects in the disclosed technique do not signify that a specific exemplary embodiment may include all of them or include the effects, so the scope of the disclosed skill is not to be understood to be restricted by the exemplary embodiment described in the specification.

In addition, terms that are described in the present invention are to be understood as follows.

Terms such as "first," "second," etc., may be used to distinguish one constituent element from another constituent element, and the scope must not be restricted by the terms. For example, a first constituent element may be called a second constituent element, and similarly, the second constituent element may be called the first constituent element.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "directly connected or coupled" to another component, it may be connected to or coupled to another component without another component intervening therebetween. In addition, other expressions that describe relationships among constituent elements such as, "between," "just between," or "adjacent to" and "directly adjacent to" must be understood in a like manner.

An expression used in the singular encompasses an expression of the plural, unless it has a clearly different meaning in the context, and in the present specification, it is to be understood that terms such as "including," "having," etc. are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

Identification codes (e.g., a, b, c, etc.) in respective stages are used for better comprehension and ease of description, but they do not necessarily describe an order of the respective stages, and the respective stages may be performed in an different order from the described order unless a specific order is written in the context. That is, the respective stages may be performed according to the described order, they may be performed substantially simultaneously, and they may be performed in an opposite order.

The present invention can be implemented as a computer-readable code in a computer-readable recording medium, and the computer-readable recording medium includes all types of recording apparatuses in which data that can be read by a computer system is stored. Examples of the computer-readable recording media include a ROM, a RAM, a CD-ROM, a magnetic tape, a floppy disk, an optical data storage unit, a non-memory semiconductor, etc., and in addition, they include a recording medium implemented in the form of a carrier wave (for example, transmission through the Internet). The computer readable recording medium may also be distributed to computer devices connected by a network so that the computer readable codes are stored and executed in a distributed fashion.

Furthermore, unless defined differently, all the terms used herein, including technical or scientific terms, have the same meanings as those generally understood by a person of ordinary skill in the art. The terms defined in the general dictionaries should be interpreted as having meanings agreeing to the contextual meanings in the art, and unless defined explicitly in the present application, are not interpreted as having ideally or overly formal meanings.

An exemplary embodiment of the present invention will now be described in detail with reference to accompanying drawings.

Figure 2:
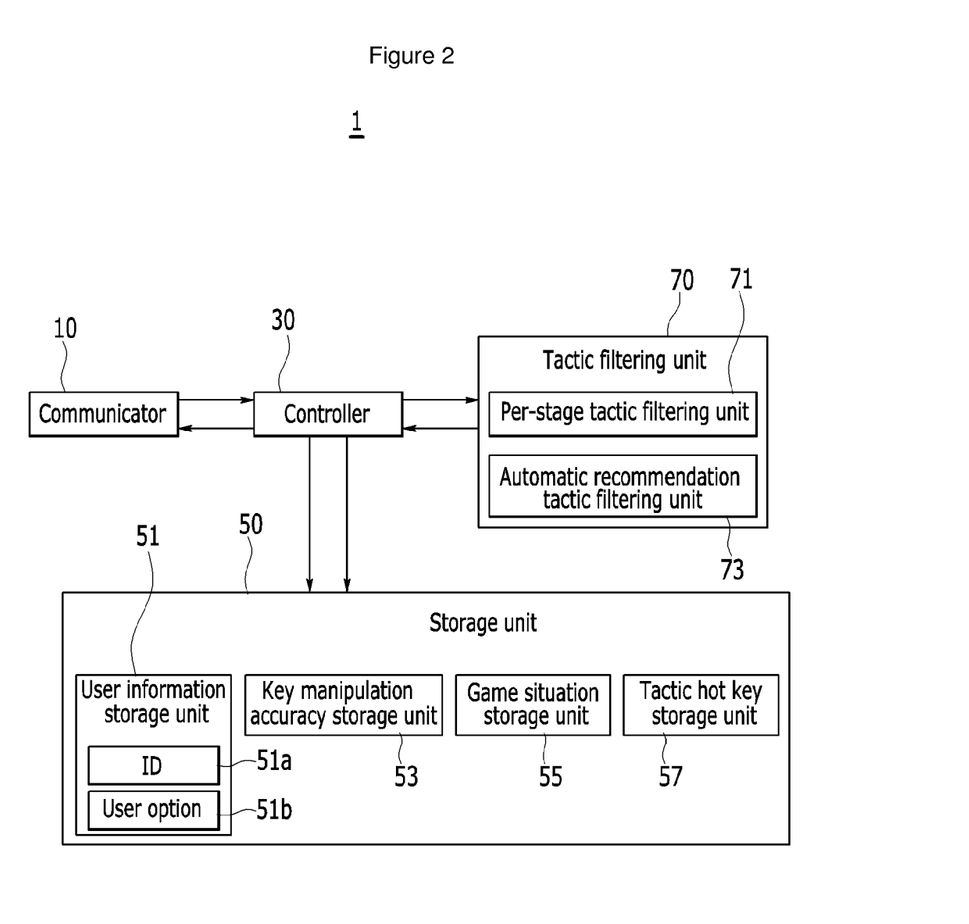
FIG. 2 shows a block diagram of a server for providing a tactic hot key service according to an exemplary embodiment of the present invention.

FIG. 2 shows a block diagram of a server for providing a tactic hot key service according to an exemplary embodiment of the present invention. As shown in FIG. 2, the server 1 for providing a tactic hot key service includes a communicator 10, a controller 30, a storage unit 50, and a tactic filtering unit 70.

The communicator 10 is connected to a plurality of terminals in a wired or wireless manner, receives a manipulation of keyboards of respective terminals, and displays a tactic hot key based on a tactic hot key matched to and stored in the storage unit 50, or when the tactic filtering unit 70 outputs data based on the data induced by a game situation or a user's key manipulation, they are input to the communicator 10 through the controller 30 and are transmitted as data satisfying a plurality of respective terminals in a wired or wireless manner.

In the present application, the terminal is defined as an opposite concept of a server referring to a computer that supplies information, and the user is defined as a natural person who manipulates the terminal.

The controller 30 is configured to control respective constituent elements, it is an input/output path of data that are output by the respective constituent elements, and when the data that are output by a plurality of terminals are input through the communicator 10, it controls the data to be stored in the storage unit 50, while when it displays tactic hot keys to be displayed by a plurality of terminals, it filters the same according to the users' skill and displays them for respective stages, or automatically recommends and displays a tactic hot key depending on the game situation, and it receives data from the storage unit 50 and outputs it to the communicator 10 or it receives the tactics recommended and filtered by the tactic filtering unit 70 for respective stages and outputs the same to the respective terminals through the communicator 10.

The storage unit 50 includes a user information storage unit 51, a key manipulation accuracy storage unit 53, a game situation storage unit 55, and a tactic hot key storage unit 57, and the user information storage unit 51 receives and stores proper identity code such as an ID 51a so as to identify the user manipulating each terminal, and receives and stores a user option 51b for receiving a state of whether to progress an automatic recommendation mode.

The key manipulation accuracy storage unit 53 compares an input of the user manipulating a terminal and a key that is to be input under the game situation, and stores an accuracy value so as to check by what accuracy level the users manipulating the terminals manipulated the basic key satisfying the game situation, for example, it stores a probability by percentage by processing it as a false input when a user has moved the player to the left when the ball moves to the right and processing it a false input when the player slides and tackles to fall when he must shoot the ball.

That is, it compares the user's input and the key's input and counts the percentage of false inputs in a like manner of storing 0% when there are ten user inputs and a novice does not know which key he has to press and he performs ten false inputs, and storing 30% when he performs three right inputs and seven false inputs.

The game situation storage unit 55 stores the situation in real-time in order to detect which tactics must be applied in the current game situation, and when the user selects a strategy automatic selection mode as an option and stores it in the user option 51b and the game situation storage unit 55 checks the game situation and transmits it to the controller 30 in real-time, the controller 30 outputs it to the tactic filtering unit 70, and the tactic filtering unit 70 automatically detects the strategy to be applied in the current game situation and outputs it to the communicator 10 through the controller 30 so that the tactics suitable for the user who manipulates each terminal may be shown.

The tactic hot key storage unit 57 matches the hot key and the tactics and stores them, it stores predetermined tactics matching predetermined hot keys so as to move the players according to the user's manipulation or change formations, positions, or tactics, and the predetermined hot keys may be changed by the user's choice, may be realized as a mouse according to changes and development of the keyboard, and may be obviously modified in various ways.

The tactic filtering unit 70 includes a per-stage tactic filtering unit 71 and an automatic recommendation tactic filtering unit 73, and the per-stage tactic filtering unit 71 does not display all tactic hot keys but filters a tactic icon to be displayed to the user and outputs it to the controller 30 so as to show the tactic key suitable for the situation in a stepwise manner according to the user's key manipulation accuracy.

The automatic recommendation tactic filtering unit 73 filters appropriate tactics by using the data of the game situation storage unit 55 when the user desires to receive recommended tactics and apply the same, that is, the users who are not yet familiar with the game desire a recommendation and select an automatic recommendation mode with the user option 51b, and the filtered tactics are output to the controller 30 and then transmitted to the terminal through the communicator 10.

Figure 3A:
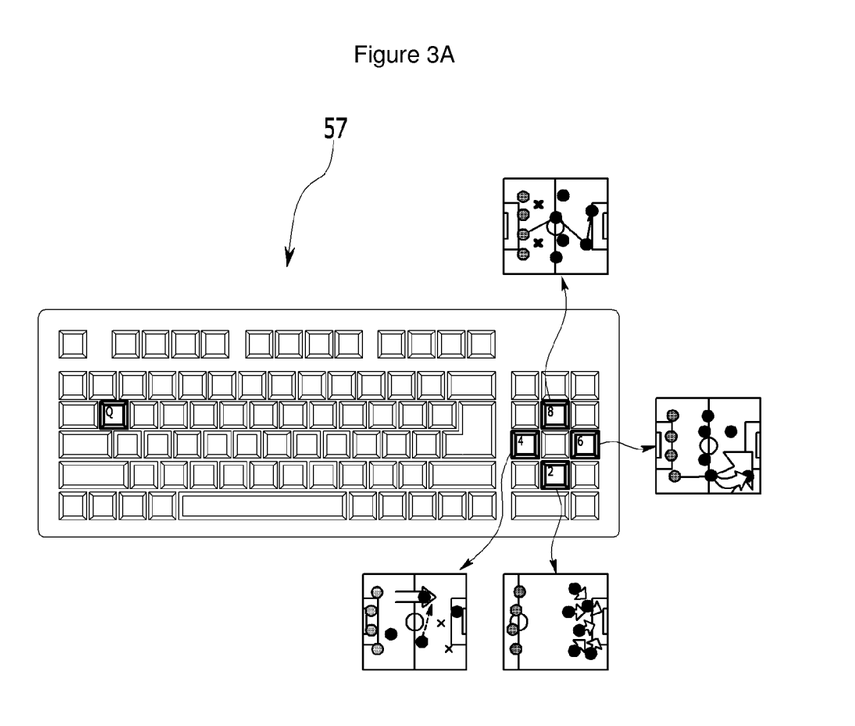
FIG. 3 shows a diagram for realizing a tactic hot key service of FIG. 2 according to an exemplary embodiment of the present invention.

FIG. 3A shows a diagram for realizing a tactic hot key service of FIG. 2 according to an exemplary embodiment of the present invention. As shown in FIG. 3A, an attack tactic matches a number pad of the keyboard, and the tactic hot key storage unit 57 matches the hot key of the keyboard and the respective tactics and stores them.

A number pad 8 (↑) represents a counterattack (CA), and in the case of the opponent's attack, it takes their ball and penetrates behind the opponent, so this strategy may be useful especially when the opponent midfielder breaks away from his position, and is efficient when the user owns many players with high physical strength since this uses a lot of physical strength of the midfielder and the striker.

A number pad 4 (←) is for a 3rd man release (MR), it represents a case in which a ball is passed to the striker in the midfielder and a third midfielder rushes to the center of the field to make an opportunity to pass to the striker. This strategy is good to use when the player of his team is ordered to leave or it is difficult to run because of injury, and a risk factor of the strategy is that the attack may be easily broken because of weak midfielders when the players attack and suddenly possession of the ball is lost.

A number pad 2 (↓) is for a box overload (BO), which is a strategy of sending more players further in the penalty box to overwhelm the defenders and the goalkeeper, and this strategy provides a crossing chance that is efficient and good at playing the rebounded ball and allows to overwhelm the team with a lesser number of defenders, but it must be warned that there may be an easy counterattacked when they lose the ball to the opponent.

A number pad 6 (→) is for a wing play (WP), which represents a strategy in which wingers support the attack and approach the touch line for a better pass in the area, and this strategy is a good skill when it is used for the formation for defending against attack in the middle of the field.

The number pads stored in tactic hot key storage unit 57 and the matched tactics may ① display all tactics according to attacks so that the users may easily use them, that is, so as to prevent the cases in which the users may fail to implement the item of tactics, ② detect the users' key accuracy in consideration of various levels of the users' skills, and may display further per-stage tactics as the users' key manipulation skills increase, and ③ automatically apply the tactics when the users press the tactic key so that they may detect the game situation in real-time and apply the strategy for controlling other players controlled by AI when they determine to use the tactics that is automatically recommended, thereby allowing various modifications.

Figure 3B:
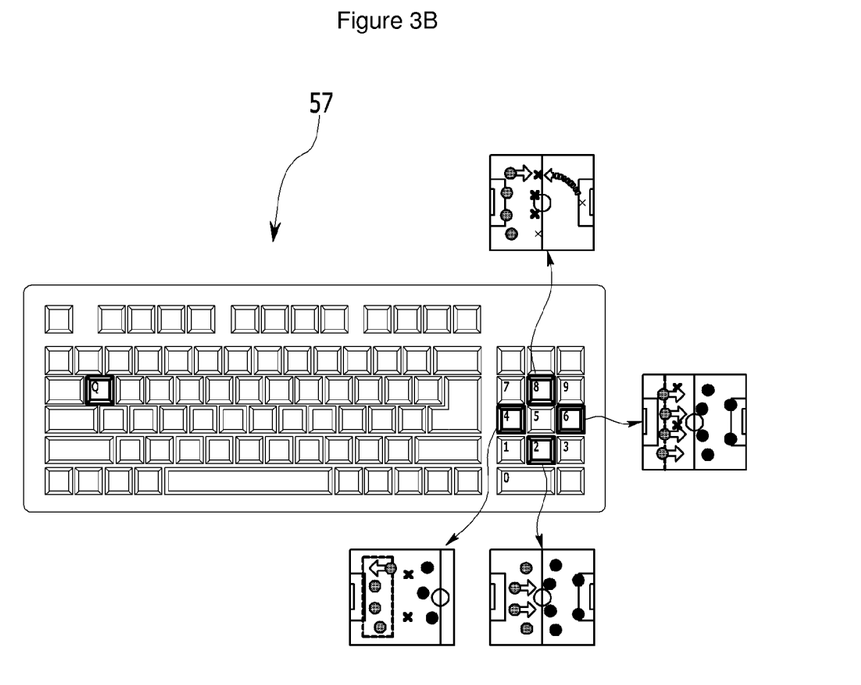

On the contrary, when the defense is performed, as shown in FIG. 3B, while a Q button is pressed, that is, when the user presses the hot key at the place where the key he must basically press is placed and the key of the number pad together, the defense tactics may be performed, and the defense tactics match the hot key and are stored in the tactic hot key storage unit 57 together with the hot key.

When the number pad 8 (↑) and the Q button are pressed together, a pressing (PR) defense is indicated, which is a strategy for quickly approaching the opponent striker who will receive a passed ball and intercepting the ball, and the pressing defense without allowing any breathing space may annoy the opponent strikers' passes or attacks, but this strategy requires much physical strength since it exhausts the physical strength of the defenders, and it cannot be used with a zone defense (ZD)

When the number pad 4 (←) and the Q button are pressed together, a flat back (FB) defense is indicated, which is a strategy for maintaining the formation of the defense line by stopping the defense action that goes too far ahead, and this strategy is very useful since it make the offside trap more efficient.

When the number pad 2 (↓) and the Q button are pressed together, a zone defense (ZD) is indicated, which signifies a strategy by which a defender approaches the striker and takes the ball in his area and returns to his position to not break the balance of the defenders, and this strategy cannot be simultaneously used with the pressing (PR) defense.

When the number pad 6 (→) and the Q button are pressed together, an offside trap (OT) is indicated, which is a strategy by which the formation of defenders goes forward to induce an offside from the attacking strikers, and when this strategy is used, the user must be warned since it easily allows a one-on-one chance when the opponent striker avoids the trap.

The number pads stored in the tactic hot key storage unit 57 and the matched tactics may ① display all tactics according to attacks so that the users may easily use them, that is, so as to prevent the cases in which the users may fail to utilize the item of tactics, ☐ detect the users' key accuracy in consideration of various levels of the users' skills, and may display further per-stage tactics as the users' key manipulation skills increase, and ☐ automatically apply the tactics when the users press the tactic key so that they may detect the game situation in real-time and apply the strategy for controlling other players controlled by AI when they determine to use the tactics that are automatically recommended, thereby allowing various modifications.

In addition, when a 0 button is pressed, the hot key may be set to continuously change the formation, and in the case of the button of number 5, all attack is switched to all defense each time the button is pressed so that the attack and the defense may be simultaneously used with one button, the user uses the button provided at the left of the keyboard to control the respective players, and when the user uses direction keys (▲, ◄, ▼, ►) to shift the players and the player who is nearest the ball is automatically designated, he can control the player.

Therefore, when the respective skills are implemented with the left hand, the players are moved by using a direction key with the right hand, and the tactics are changed while the player is moved, respective tactics may be applied by using the number pads provided close by the direction key with the right hand, and a reason of using not the number pads above the alphabet keys but the number pads near the direction key is to increase accessibility and availability of the user who drives the number pads having the up, down, left, and right (↑,↓,←,→) marks in a like manner of the direction key.

Figure 4:
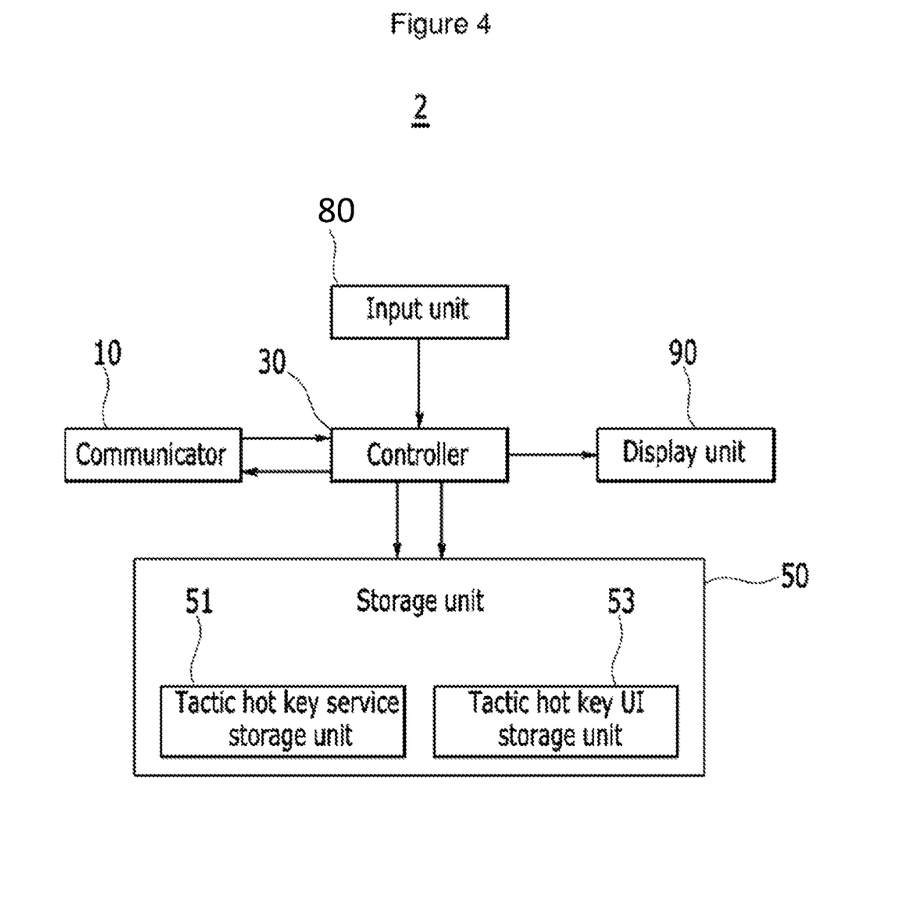
FIG. 4 shows a block diagram of a terminal for providing a tactic hot key service according to an exemplary embodiment of the present invention.

FIG. 4 shows a block diagram of a terminal for providing tactic hot key service according to an exemplary embodiment of the present invention. Referring to FIG. 4, the terminal 2 for providing a tactic hot key service according to an exemplary embodiment of the present invention includes a communicator 10, a controller 30, a storage unit 50, an input unit 80, and a display unit 90.

Regarding the same reference numerals in FIG. 2 and FIG. 4 according to an embodiment of the present invention, it will be defined that the reference numerals that are indicated in FIG. 2 and the reference numerals that are indicated in FIG. 4 respectively indicate the constituent elements of FIG. 2 and FIG. 4, the reference numerals that are used to describe FIG. 2 only indicate those that are included in FIG. 2, and the reference numerals that are used to describe FIG. 4 only indicate those that are included in FIG. 4.

The communicator 10 is connected to the server 1 in a wired or wireless manner to receive updated contents or patches from the server 1 and output them to the controller 30, and output data such as respective game situations or key manipulation that are input by the user through the input unit 80 to the server 1 through a wired or wireless network.

The controller 30 is configured to control the respective constituent elements, it is an input/output path of the data that are output by the respective constituent elements, and when the data that are output by the server 1 are input through the communicator 10, it controls to store them in the storage unit 50, it controls the display unit 90 to display a tactic hot key to the user based on the data stored in the storage unit 50, and it controls the user's key input that is input by the input unit 80 to the server 1 through the communicator 10.

The storage unit 50 includes a tactic hot key service storage unit 51 and a tactic hot key UI storage unit 53, the tactic hot key service storage unit 51 stores a program for driving a tactic hot key service downloaded from the server 1, and the tactic hot key UI storage unit 53, when controlled in real-time by the server 1, stores the UI that will be displayed to the user so as to display the hot key to the display unit 90 according to the controlled data.

The input unit 80 is configured with a keyboard, matching of the hot key of the keyboard is stored in the server 1 and/or the terminal 2, and when the user presses the hot key of the input unit 80, it is configured to perform a corresponding control, and it is configured to receive the user's input and output the same to the controller 30.

The display unit 90 is provided to display various screens of a game to the user, and when the controller 30 instructs to output a UI so that the user may easily use the tactic hot key, it displays various data and UIs to the user so as to increase availability of the tactic item.

A terminal for providing a tactic hot key service according to an embodiment of the present invention may drive a program according to the terminal's self driving, or by using the data that are checked in real-time through the server, and when the program is driven by the terminal's self driving, it is driven by the program downloaded from the server, while the same is driven by the data that are checked in real-time through the server, it is driven by control of the server, which is optional by a realization method.

Figure 5:
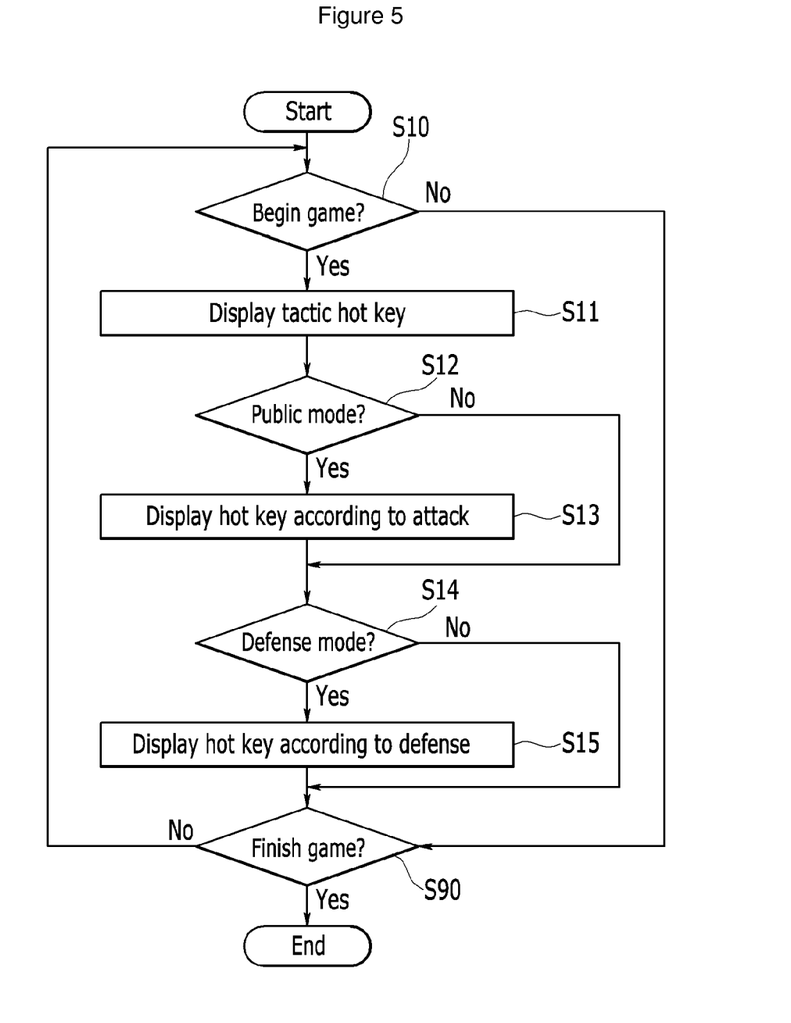
FIG. 5 shows a flowchart of a method for providing a tactic hot key service according to an exemplary embodiment of the present invention.

FIG. 5 shows a flowchart of a method for providing a tactic hot key service according to an exemplary embodiment of the present invention. As shown in FIG. 5, a method for providing a tactic hot key service according to an embodiment of the present invention starts by checking whether a game has begun (S10).

Here, a tactic hot key is displayed (S11), and when it is an attack mode (S12), a server or a terminal outputs a hot key caused by an attack, that is, matching expressed in Table 1, to a display unit of the terminal (S13).

TABLE 1

| Hot key | Contents |
| --- | --- |
| Number pad 8(↑) | Counterattack (CA) |
| Number pad 4(←) | 3rd man release (MR) |
| Number pad 2(↓) | Box overload (BO) |
| Number pad 6(→) | Wing play (WP) |
| Number pad 5 | All attack |
| Number pad 0 | Formation change |

In the case of a defense mode (S14), the server or the terminal outputs a hot key caused by the defense, that is, matching expressed in Table 2, to the display unit of the terminal (S15).

TABLE 2

| Hot key | Contents |
| --- | --- |
| Number pad 8(↑) + Q | Pressing defense (PR) |
| Number pad 4(←) + Q | Flat back defense (FB) |
| Number pad 2(↓) + Q | Zone defense (ZD) |
| Number pad 6(→) + Q | Offside trap (OT) |
| Number pad 5 | All attack |
| Number pad 0 | Formation change |

Until the game ends, it goes to the stage S10 to continuously drive the tactic hot key display according to an exemplary embodiment of the present invention (S90).

Since disposition reasoning and matching contents of the tactic hot key correspond to the above-described contents, no repeated contents will be provided.

Figure 6A:
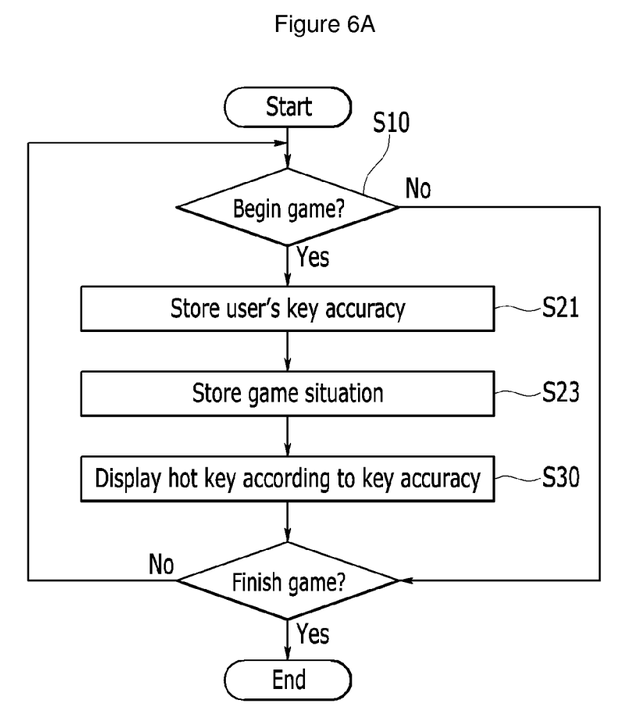
FIG. 6 shows a flowchart of a method for providing a tactic hot key service according to an exemplary embodiment of the present invention.

FIG. 6 shows a flowchart of a method for providing a tactic hot key service according to an exemplary embodiment of the present invention. As shown in FIG. 6, when a game starts (S10), the user's key accuracy is stored in the key manipulation accuracy storage unit of the server and/or the tactic hot key service storage unit of the terminal for a predetermined time, a game, or a predetermined period (S21).

The key accuracy is provided for determining how fluently the user uses the key for a predetermined time, a game, or a predetermined period so as to check inexperienced manipulations such as controlling to run in the opposite direction and attempt to score an own goal at the time of shooting, or kicking or doing a sliding tackle to fall at the time of passing.

For this purpose, when the user inputs a key through an input unit of the terminal, it is counted and stored whether the key input to the tactic hot key service storage unit of the terminal and/or the key manipulation accuracy storage unit of the server is right or wrong, and for example, when there are 100 manipulations and 30 correct manipulations are performed, it is stored as 30%, and when 70 correct manipulations are performed out of the 100 manipulations, it is saved as 70%.

Then, the game situation is monitored, it is updated in real-time, it is stored in the game situation storage unit of the server or the tactic hot key service storage unit of the storage unit (S23), a tactic hot key that is appropriate for the current game situation is displayed according to key accuracy (S30), and it returns to the start stage S10 and repeatedly drives a loop until the game is over.

Here, when the key accuracy is 30% and three tactic hot keys appropriate for the situation are provided, it is difficult for the user who is bad at driving basic driving keys to further press the tactic hot key for applying all tactics so the server and/or the terminal controls one of the three tactic hot keys to be displayed on the display of the terminal.

That is, it is driven in a like manner of a tutorial system so that the user may learn the tactic hot key step by step by showing the tactics that are appropriate for the situation by a number that is linearly or step-by-step proportional to the key accuracy.

Figure 6B:
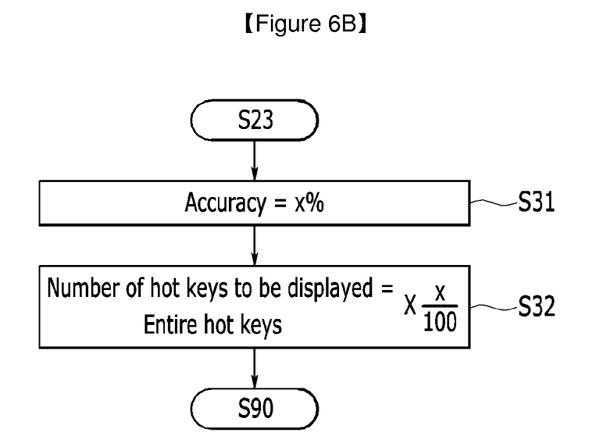

In detail, as shown in FIG. 6B, when the accuracy is x % (S31), the number of hot keys to be displayed to the display unit of the terminal is expressed as in Equation 1 (S32).

$$\text{Number of hot keys to be displayed} = \text{Total hot keys} \times \frac{x}{100} \quad \text{(Equation 1)}$$

Figure 6C:
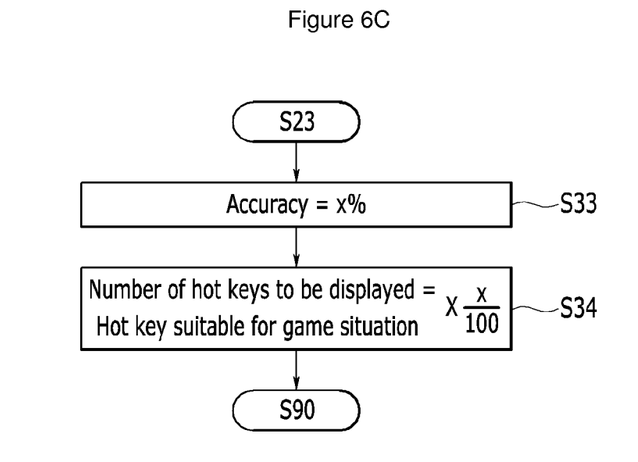

Further, random illustration of the tactic hot key may cause confusion in its application, so it is possible to show it in a like manner of FIG. 6C and Equation 2.

$$\text{Number of hot keys to be displayed} = \text{Total hot keys appropriate for game attention} \times \frac{x}{100} \quad \text{(Equation 2)}$$

That is, when the accuracy is x % (S33), regarding the number of hot keys to be displayed, the tactic hot keys determined by the number found by multiplication of the number of hot keys that are appropriate for the game situation by x % are displayed in order of tactical importance, and for example, when a user with 30% accuracy has three hot keys suitable for the current game situation, one hot key is displayed, and in this instance, the tactics that are to be applied in the most important manner to that situation are input to the hot key to be shown, which is determined by the server and/or the terminal, and are then shown in priority order.

In Equation 1 and Equation 2, natural numbers can be made by using various equations such as rounding off, discarding, or rounding at one decimal place, which is modifiable in various ways depending on the situations of respective game providers and the users' usage states.

Figure 7:
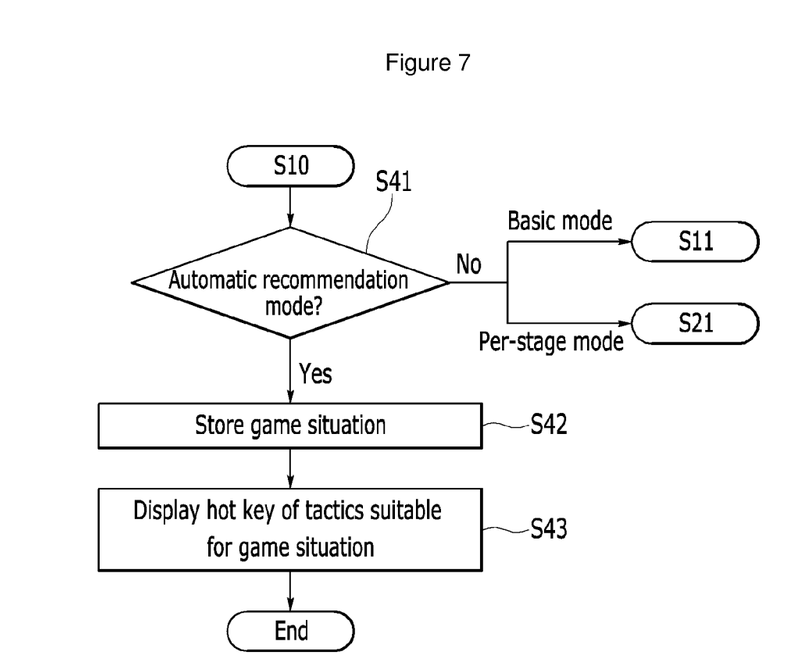
FIG. 7 shows a flowchart of a method for providing a tactic hot key service according to an exemplary embodiment of the present invention.

FIG. 7 shows a flowchart of a method for providing a tactic hot key service according to an exemplary embodiment of the present invention. As shown in FIG. 7, when the user selects an automatic recommendation mode for the server and/or the terminal as a user option (S41), the game situation is stored in the game situation storage unit of the server and/or the tactic hot key service storage unit of the terminal, and the hot key of the tactics that are appropriate for the game situation are displayed (S43).

This is divided into a method for applying the tactics when the user can press one button and a method for using the original strategy button.

That is, one of buttons of number pads excluding the tactics and formation buttons, that is, the buttons 0, 1, 3, 7, and 8, is set and its hot key is pressed, all tactics are applicable, and for example, it is assumed that the number 0 is set to be the hot key for applying a tactic, the counterattack (CA) and the wing play (WP) are selected as the tactics suitable for the game situation, and they are displayed to the user.

Here, a single pressing of the number 0 selects and applies the counterattack (CA), pressing of the number 0 twice selects and applies the wing play (WP), and an illustrated order of the tactics is designated in order of strategic importance appropriate for the game situation.

In the embodiment of the present invention, the hot key of the number pad may be randomly set by the user or may be changeable in various ways.

The method for using the original tactic button is similar to an application intent of a tutorial system for teaching the user to be familiar with the tactic hot key, and for example, when the wing play (WP) or the box overload (BO) is needed in the current game situation, the strategy is applied when he uses the number pads 6 and 2, which are the original buttons.

Finally, when the automatic recommendation mode is not performed (S41), it may be possible to proceed to the basic mode (S11), and it may be possible to proceed to the per-stage mode (S21), which is optional.

Figure 8A:
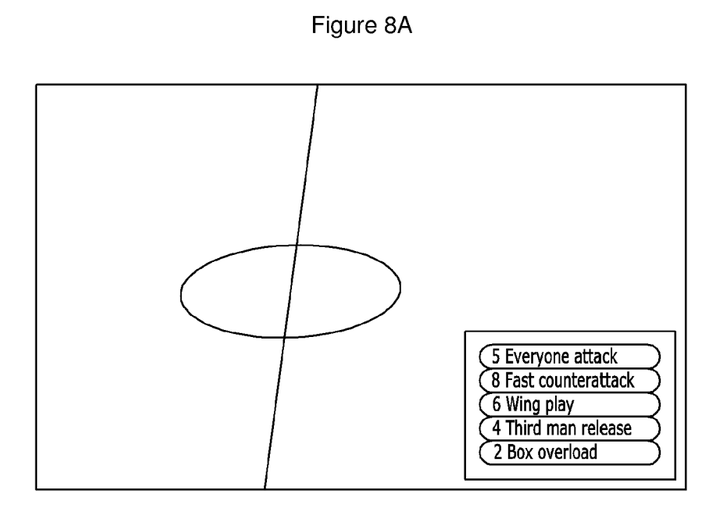
FIG. 8 shows a screen for realizing a tactic hot key service according to an exemplary embodiment of the present invention.

FIG. 8A shows a screen for realizing a tactic hot key service according to an exemplary embodiment of the present invention. As shown in FIG. 8A, in the case of the attack mode, the tactic hot keys may be disposed on the upper, lower, left side, and right side of the user's screen, they may be overlaid with a transparent frame, the hot keys and names may be expressed with colors distinguishable from the color of the field or may be displayed as described, and the design is modifiable in various ways.

That is, it may ① display all tactics according to attacks so that the users may easily use them, that is, so as to prevent the cases in which the users may fail to use the item of tactics, ③ detect the users' key accuracy in consideration of various levels of the users' skills, and may display further per-stage tactics as the users' key manipulation skills increase, and ③ automatically apply the tactics when the users press the tactic key so that they may detect the game situation in real-time and apply the strategy for controlling other players controlled by AI when they determine to use the tactics that are automatically recommended, thereby allowing various modifications.

Figure 8B:
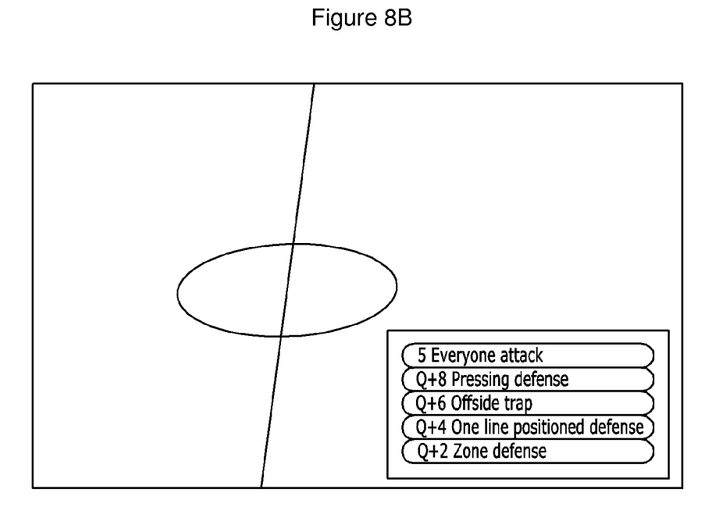

In another way, in the case of the defense, as shown in FIG. 8B, the tactic hot keys may be disposed on the upper, lower, left side, and right side of the user's screen, they may be overlaid with a transparent frame, the hot keys and names may be expressed with colors distinguishable from the color of the field or may be displayed as described, and the design is modifiable in various ways.

The number of displayed cases and various methods correspond to the above-described contents so no repeated contents will be provided.

The present specification may ☐ allow to change a formation that is mistakenly set by the user by recognizing a hot key shown on the screen while playing a game, and prevent the user from selecting giving up the game or leaving it while the game is performed, by providing a hot key that is familiar to him in addition to hot keys that are used in the game so that he may change the formation according to game flows and may actively use an formation change item, ② use abundant items at 100% to increase interest in the game by setting the hot key with a key familiar to the user and display it on the screen so that he may actively use a tactic item for controlling other players as well as players controlled by him, ③ consider the differences of skills of respective users, distinguish the user for respective stages according to key usage accuracy of the user, display tactics keys in a stepwise manner according to distinguished levels until he accurately uses the tactics key to provide a game and teach him until he fully uses it so that new users may easily apply tactics, ④ easily recognize and change the tactics when he is busy focusing on the screen by showing the hot key on the screen so that he may actively use contents such as formations or tactics, and ⑤ automatically recommend a tactic satisfying the current game situation, and when the game is played in the recommendation mode, allow the recommended tactics to be automatically applied when the user presses the same key, and thereby allow him to change the tactics quite freely when he tries to change the tactics but lacks skills, continuously display the same key on the screen so that he may recognize it, and allow him to actively use the tactics item.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A server for providing a tactic hot key service, comprising:
   a communication interface connected to a plurality of terminals in a wired or wireless manner, receiving a manipulation input for a terminal, and transmitting data to the terminal in response to the manipulation input;
   a storage which stores a plurality of identity codes identifying the terminals or users of the terminals, a plurality of tactics used in a game, and a plurality of hot keys to execute the tactics;
   a controller which controls the communication interface and the storage to display at least one tactic among the tactics and at least one hot key among the hot keys matching the at least one tactic on a screen of the terminal based on the manipulation input.

2. The server of claim 1,
   wherein the controller executes a computer program instruction to implement a tactic filtering unit which controls a number of the at least one hot key and the at least one matching tactic based on an accuracy of manipulation inputs, with respect to the plurality of tactics stored in the storage, from the terminal or a user of the terminal which is previously measured and stored in the storage, the number of the at least one hot key being proportional to the accuracy,
   wherein the controller outputs the at least one hot key of which the number is controlled by the tactic filtering unit and the at least one matching tactic to the communication interface for display on the screen of the terminal.

3. The server of claim 2, wherein when a number of the at least one matching tactic is two or more, the controller controls the at least one matching tactic to be displayed on the screen of the terminal in an order of a predetermined importance assigned to each of the at least one matching tactic.

4. The server of claim 1, further comprising a memory which stores a computer program instruction to implement a tactic filtering unit to receive information about a current situation of the game and outputs the at least one tactic corresponding to the current situation when a mode for automatically recommending the at least one tactic is selected by the terminal or a user of the terminal,
   wherein the controller controls the at least one tactic corresponding to the current situation and the at least one matching hot key to be displayed on the screen of the terminal.

5. The server of claim 1, wherein the plurality of hot keys to execute the plurality of tactics are implemented by a plurality of number pads provided on a keyboard of the terminal.

6. The server of claim 5, wherein the game is a soccer game, and
   wherein the plurality of number pads comprise number pads for up, down, left, and right directions, and a number pad provided in a center of the up, down, left, and right directions is used in common for an attack mode and a defense mode of the tactics.

7. The server of claim 1, wherein the game is a soccer game, and
   wherein the storage further stores data on a formation of the soccer game and a hot key, among the hot keys, matching the formation.

8. The server of claim 7, wherein the hot key matching the formation corresponds to a number pad provided at a lower portion of a plurality of number pads provided on a keyboard of the terminal.

9. The server of claim 8, wherein the hot key matching the formation corresponds to a number pad provided between a number pad in a down direction and a direction key.

10. A method for providing a tactic hot key service, comprising:
    storing, in a server or a terminal when a game begins, key accuracy of manipulation inputs of the terminal or a user of the terminal;
    monitoring, by the server or the terminal, a game situation of the game and storing the game situation;
    matching at least one tactic among tactics used in the game and at least one hot key among hot keys to execute the tactics; and
    controlling the server or the terminal to output of the at least one tactic of which a number is controlled to be proportional to the key accuracy, and displaying the at least one tactic and the at least one matching hot key on a screen of the terminal.

11. The method of claim 10, further comprising:
    when the number is two or more, displaying the at least one tactic to the screen of the terminal in an order of a predetermined important assigned to each of the at least one matching tactic.

12. The method of claim 10, further comprising:
    when a mode for automatically recommending the at least one tactic is selected by the terminal or the user manipulating the terminal, storing the selection in the server or the terminal; and
    recommending, by the server or the terminal, the at least one tactic corresponding to the game situation, and displaying the recommended at least one tactic and the at least one matching hot key on the screen.

13. The method of claim 10, wherein the hot keys to execute the tactics are implemented by a plurality of number pads provided on a keyboard of the terminal.

14. The method of claim 13, wherein the game is a soccer game and,
    the plurality of number pads comprise number pads for up, down, left, and right directions, and a number pad provided in a center of the up, down, left, and right directions is used in common for an attack mode and a defense mode of strategy.

15. A non-transitory computer readable medium recorded with a program for executing a computer-implemented method for providing a tactic hot key service, wherein the program comprises:
- a function for storing, in a server or a terminal when a game begins, key accuracy of manipulation inputs of the terminal or a user of the terminal, monitoring, by the server or the terminal, a game situation of the game and storing the game situation;
- a function for matching at least one tactic among tactics used in the game and at least one hot key among hot keys to execute the tactics; and
- a function for controlling the server or the terminal to output the at least one tactic of which a number is controlled to be proportional to the key accuracy, and displaying the at least one tactic and the at least one matching hot key on a screen of the terminal.

* * * * *